(12) United States Patent
Uchida et al.

(10) Patent No.: US 9,090,133 B2
(45) Date of Patent: Jul. 28, 2015

(54) PNEUMATIC TIRE HAVING CONDUCTIVE LAYER AND RUBBER CEMENT LAYER

(75) Inventors: Mamoru Uchida, Kobe (JP); Takao Wada, Kobe (JP); Tomoaki Hirayama, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1048 days.

(21) Appl. No.: 11/713,056

(22) Filed: Mar. 2, 2007

(65) Prior Publication Data
US 2007/0215257 A1   Sep. 20, 2007

(30) Foreign Application Priority Data
Mar. 16, 2006   (JP) ................................. 2006-072075

(51) Int. Cl.
*B60C 19/08*   (2006.01)

(52) U.S. Cl.
CPC ............... *B60C 19/08* (2013.01); *B60C 19/086* (2013.01)

(58) Field of Classification Search
CPC .............................. B60C 19/08; B60C 19/086
USPC .................... 152/152.1, DIG. 2, 209.5
See application file for complete search history.

(56) References Cited

U.S. PATENT DOCUMENTS

| | | | | |
|---|---|---|---|---|
| 2,339,546 | A * | 1/1944 | Hanson ....................... | 152/152.1 |
| 5,518,055 | A * | 5/1996 | Teeple et al. ................ | 152/152.1 |
| 5,871,597 | A * | 2/1999 | Vasseur ....................... | 152/209.5 |
| 5,942,069 | A   | 8/1999 | Gerresheim et al. | |
| 6,044,882 | A * | 4/2000 | Crawford et al. ........... | 152/152.1 |
| 6,046,266 | A * | 4/2000 | Sandstrom et al. ........... | 524/492 |
| 6,228,929 | B1  | 5/2001 | Larson et al. | |
| 6,520,229 | B1 * | 2/2003 | Muraoka et al. ........... | 152/152.1 |
| 2002/0107317 | A1 | 8/2002 | Garro et al. | |
| 2005/0103412 | A1 * | 5/2005 | Zanzig et al. ............... | 152/152.1 |

(Continued)

FOREIGN PATENT DOCUMENTS

| EP | 477542 | * | 4/1992 |
|---|---|---|---|
| EP | 819555 | * | 1/1998 |

(Continued)

OTHER PUBLICATIONS

Japanese Office Action mailed Jun. 15, 2010 for corresponding Japanese Application No. 2006-072075.

(Continued)

*Primary Examiner* — Steven D Maki
(74) *Attorney, Agent, or Firm* — Birch, Stewart, Kolasch & Birch, LLP

(57) ABSTRACT

The objective of the present invention is to provide a pneumatic tire that can desirably prevent generation of static electricity between the road face and the tire, while maintaining a low rolling resistance, so that the safety in use is further improved. In pneumatic tire of the present invention, each of tread rubber, breaker rubber and sidewall rubber that are respectively formed on a tread section, a breaker section and a sidewall section has a volume resistivity of $1 \times 10^8$ Ω·cm or more, with a conductive layer having a volume resistivity smaller than $1 \times 10^8$ Ω·cm and a thickness in a range from 0.2 to 2.0 mm being formed between a carcass ply forming the carcass and the sidewall rubber, and at least either conductive layer or a rubber cement layer that is formed so as to be made in contact with conductive layer and has a volume resistivity lower than that of the tread rubber is exposed to the surface of the tire.

2 Claims, 2 Drawing Sheets

(56) References Cited

U.S. PATENT DOCUMENTS

| | | | |
|---|---|---|---|
| 2006/0102264 A1* | 5/2006 | Nicolas | 152/152.1 |
| 2007/0000585 A1* | 1/2007 | Uchida et al. | 152/152.1 |
| 2007/0163690 A1* | 7/2007 | Nobuchika et al. | 152/152.1 |
| 2007/0227636 A1* | 10/2007 | Mizuno et al. | 152/152.1 |

FOREIGN PATENT DOCUMENTS

| | | | |
|---|---|---|---|
| EP | 1 533 144 A1 | | 5/2005 |
| EP | 1557294 A1 | * | 7/2005 |
| EP | 1 621 365 A1 | | 2/2006 |
| EP | 1 738 935 A2 | | 1/2007 |
| EP | 1738935 | * | 1/2007 |
| GB | 544757 | * | 4/1942 |
| JP | 8-34204 A | | 2/1996 |
| JP | 8-230407 A | | 9/1996 |
| JP | 8-258503 A | | 10/1996 |
| JP | 9-71112 A | | 3/1997 |
| JP | 10-36559 A | | 2/1998 |
| JP | 10-81110 A | | 3/1998 |
| JP | 10-81783 A | | 3/1998 |
| JP | 11-48710 A | | 2/1999 |
| JP | 11-217011 A | | 8/1999 |
| JP | 2000-190709 A | | 7/2000 |
| JP | 2001-114943 A | | 4/2001 |
| JP | 2004-42858 A | | 2/2004 |
| JP | 2006-143208 A | | 6/2006 |
| JP | 2007-8269 A | | 1/2007 |

OTHER PUBLICATIONS

Office Action (Notice of Grounds for Rejection) mailed Apr. 6, 2010, for Japanese Application No. 2006-072075.

* cited by examiner

PNEUMATIC TIRE HAVING CONDUCTIVE LAYER AND RUBBER CEMENT LAYER

This nonprovisional application is based on Japanese Patent Application No. 2006-072075 filed with the Japan Patent Office on Mar. 16, 2006, the entire contents of which are hereby incorporated by reference.

BACKGROUND OF THE INVENTION

1. Field of the Invention

The present invention relates to a pneumatic tire that can reduce a fuel cost and improve the safety in use.

2. Description of the Background Art

In recent years, various methods have been proposed in which in order to reduce the rolling resistance of a tire and properly maintain the wet-grip performance, silica is used for, for example, a tread section of a tire, and also for other parts such as a breaker section and a sidewall section. However, in the case when a large amount of silica is contained, the electrical resistance of the tire is increased and there is a possibility that a spark might be generated due to static electricity to cause the fuel to catch fire, for example, during refueling for a vehicle, resulting in a safety hazard in use; therefore, there have been strong demands for providing tires that can reduce the rolling resistance and properly maintain the wet-grip performance, and also can prevent generation of static electricity.

With respect to such a pneumatic tire that can improve the conductivity and prevent a discharge phenomenon caused by accumulation of static electricity in the vehicle body, Japanese Patent Application Laid-Open No. 08-230407 has proposed a pneumatic tire in which: a rubber composition forming a tread section is allowed to contain 50 parts by weight or less of carbon black per 100 parts by weight of rubber component, with a non-carbon black based reinforcing agent being contained therein; a rubber composition forming a sidewall section is allowed to contain 40 parts by weight or less of carbon black per 100 parts by weight of rubber component; conductive thin films are affixed to the tread section and the sidewall section, with the rubber composition forming the conductive thin film having a compounding amount of carbon black of 60% by weight or more per 100 parts by weight of rubber component and being set to 35% by weight or more with respect to the entire rubber composition.

In an attempt to provide a pneumatic tire that can effectively reduce the tire electrical resistance while maintaining a superior wet performance, and also can exert these characteristics stably from the initial state of use to wear limit, Japanese Patent Laying-Open No. 2000-190709 has proposed a pneumatic tire in which: a tread rubber, constituted by a main tread rubber section made from an insulating rubber material cross-linked by silica, having a volume resistivity of $1 \times 10^8$ $\Omega \cdot$cm or more and an outer conductive section that is made from a conductive rubber member having a volume resistivity of less than $1 \times 10^8$ $\Omega \cdot$cm, forms a ground-contacting face together with the main tread section, and starts from the end edge of the ground-contacting face and ends with a distance of 3 to 35% of the ground-contacting width being interposed therebetween from the end edge of the ground-contacting face inward in the tire axial direction, and the outer conductive section, which has a sheet shape with a thickness in a range from 0.01 to 1.0 mm, is exposed to the outer face of the tread containing a groove wall and a groove bottom of a lateral groove, and continues in the tire circumferential direction, and a wing rubber, a sidewall rubber and a clinch rubber are formed by using a conductive rubber material, with the outer conductive section being connected to the wing rubber.

In an attempt to provide a rubber composition for a tire sidewall that has a low rolling resistance, is superior in abrasion resistance and wet performance and provides a tire having a low electrical resistance, Japanese Patent Laying-Open No. 10-036559 has proposed a rubber composition for a tire sidewall which is obtained by adding 5 to 50 parts by weight of carbon black having a primary particle size of 20 nm or more, a compression DBP oil absorption of 120 ml/100 g or less and a CTAB surface area of 130 m$^2$/g or less, 10 to 60 parts by weight of precipitation silica having a DBP oil absorption of 200 ml/100 g or more and a BET nitrogen adsorption specific surface area of 180 m$^2$/g or less and silane coupling agent setting to such an amount whose reactive factor is controlled within a specific range, to 100 parts by weight of specific diene-based rubber to be kneaded therein.

In an attempt to prevent a reduction in a conduction-preventive property in a tire tread using silica as a reinforcing agent, Japanese Patent Laying-Open No. 08-034204 has proposed a tire tread which is constituted by a strip made from a rubber composition for a tire tread having a high resistivity and extends in a length direction with a predetermined lateral width, and a conductive strip that is placed in the length direction within the lateral width and extended from the surface to the bottom face of the tread strip, and is formed by a low resistivity rubber composition for a tire having a volume resistivity of $10^8$ $\Omega \cdot$cm or less.

In the methods of the above-mentioned Documents, however, there is still room for improvements in an attempt to achieve both of the low rolling resistance and high safety in a sufficiently satisfactory level.

SUMMARY OF THE INVENTION

In order to solve the above-mentioned problems, the objective of the present invention is to provide a pneumatic tire that can desirably prevent generation of static electricity between the road surface and a tire while maintaining a low rolling resistance, and improve the safety in use without impairing the low fuel cost property.

The present invention relates to a pneumatic tire that is provided with at least: a tread section; a sidewall section; a bead section; a carcass that reaches the bead section from the tread section through the sidewall section, with a breaker section being placed on the outside of the carcass in a tire radial direction, and in this structure, each of tread rubber, breaker rubber and sidewall rubber that are respectively formed on the tread section, the breaker section and the sidewall section has a volume resistivity of $1 \times 10^8$ $\Omega \cdot$cm or more, with a conductive layer having a volume resistivity of smaller than $1 \times 10^8$ $\Omega \cdot$cm and a thickness in a range from 0.2 to 2.0 mm being formed between a carcass ply forming the carcass and the sidewall rubber, and at least either the conductive layer or a rubber cement layer that is formed so as to be made in contact with the conductive layer and has a volume resistivity lower than that of the tread rubber is exposed to the surface of the tire.

The present invention also relates to a pneumatic tire in which: the conductive layer contains at least a rubber component and carbon black that is blended in a range from 30 to 100 parts by mass per 100 parts by mass of the rubber component; the carbon black has a nitrogen adsorption specific surface area in a range from 100 m$^2$/g or more to 1500 m$^2$/g or less; and each of the tread rubber, the breaker rubber and the sidewall rubber contains a filler in such a manner that the rate at which silica occupies the filler is set to 50% by mass or more of the filler.

The present invention also relates to a pneumatic tire in which: the sidewall section is formed so that a height from the outside end of the sidewall section to the outside end of the tread section in the tire radial direction is set in a range of 0 to 15% of the height from the rim contacting portion to the outer end of the tread section in a tire radial direction in a state where the tire is mounted on a standard rim with a specified inner pressure applied thereto.

The present invention also relates to a pneumatic in which: the conductive layer is formed so as not to be exposed to the surface of the tire, and the rubber cement layer is formed on an area containing one portion of a ground contacting face.

The present invention also relates to a pneumatic tire in which: the rubber cement layer contains at least a rubber component and carbon black that is blended in a range from 30 to 100 parts by mass per 100 parts by mass of the rubber component; the carbon black has a nitrogen adsorption specific surface area in a range from 100 $m^2/g$ or more to 1500 $m^2/g$ or less.

In the pneumatic tire in accordance with the present invention, the electrical resistance of each of the rubbers respectively forming the tread section, the breaker section and the sidewall section is controlled, and a conductive layer is formed between the carcass ply and the sidewall rubber so that by controlling the electrical resistance and the thickness of the conductive layer, the rolling resistance is suppressed in a low level and the generation of static electricity between the road surface and the tire is desirably prevented. Thus, it becomes possible to obtain a pneumatic tire that improves the safety in use while maintaining a low fuel cost.

The pneumatic tire of the present invention, which can prevent generation of static electricity between the road surface and the tire without causing a big increase in the rolling resistance, is desirably applied to, for example, various vehicles such as passenger cars, trucks, buses and heavy machines.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
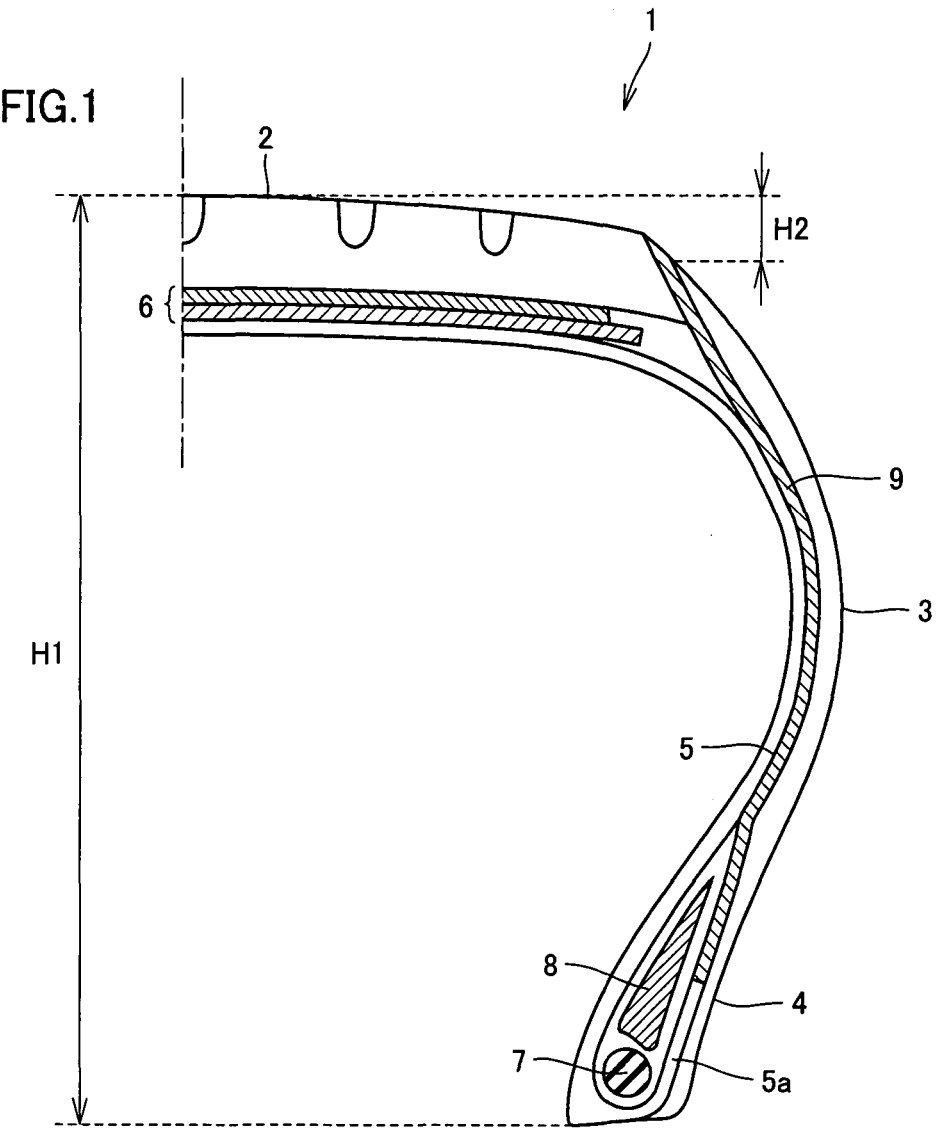
FIG. 1 is a drawing that shows right half of a cross-sectional view of a pneumatic tire in accordance with the present invention.

In a pneumatic tire of the present invention, tread rubber, breaker rubber and side wall rubber respectively constituting a tread section, a breaker section and a sidewall section are all designed to have a volume resistivity of $1\times10^8$ $\Omega\cdot cm$ or more. The volume resistivity of $1\times10^8$ $\Omega\cdot cm$ or more makes it possible to reduce the possibility of degradation in endurance and a reduction in processability.

In the pneumatic tire of the present invention, a conductive layer having a volume resistivity smaller than $1\times10^8$ $\Omega\cdot cm$ and a thickness in a range from 0.2 to 2.0 mm is placed between a carcass ply and the sidewall rubber, and at least either the conductive layer or a rubber cement layer that is formed in contact with the conductive layer and has a volume resistivity lower than that of the tread rubber is exposed to the tire surface. In other words, in the present invention, the volume resistivity of each of the tread rubber, the breaker rubber and the sidewall rubber is set to $1\times10^8$ $\Omega\cdot cm$ or more, and while the tire performances such as rolling resistance and durability are properly maintained, the conductive layer and/or the rubber cement layer having a volume resistivity in a low level are separately placed so as to be exposed to the tire surface; thus, static electricity generated between the ground contacting face of the pneumatic tire and the road surface is eliminated by the conductive layer to prevent a discharging phenomenon. Consequently, it is possible to provide a pneumatic tire that can maintain the rolling resistance in a low level, and improve the safety in use as well as upon supplying fuel or the like.

Here, in the present specification, the value of volume resistivity is measured by JIS K6271.

In the present invention, it is only necessary to expose at least either the conductive layer or the rubber cement layer formed in contact with the conductive layer to the tire surface. In the present invention, in the case when the rubber cement layer is not formed, the conductive layer is exposed to the tire surface, and in the case when the rubber cement layer is formed, one portion or the entire portion of the exposed portion of the conductive layer to the tire surface is covered with the rubber cement layer so that the conductive layer and the rubber cement layer or only the rubber cement layer is exposed to the tire surface. When the rubber cement layer is formed, the volume resistivity of the rubber cement layer is made lower than that of the tread rubber, and since the rubber cement layer is made in contact with the conductive layer, static electricity, generated between the ground contacting face and the road face is released to the conductive layer through the rubber cement layer so that a discharging phenomenon due to the static electricity is prevented. In the case when the rubber cement layer is formed so as not to expose the conductive layer to the tire surface, it is advantageously possible to obtain better durability.

The volume resistivity of the conductive layer formed in the pneumatic tire of the present invention is made smaller than $1\times10^8$ $\Omega\cdot cm$; When the volume resistivity of the conductive layer is made smaller than $1\times10^8$ $\Omega\cdot cm$, the effect for improving the tire conductivity is obtained to a desired degree. The volume resistivity of the conductive layer is preferably set to $1\times10^7$ $\Omega\cdot cm$ or less, more preferably, to $1\times10^6$ $\Omega\cdot cm$ or less. From the viewpoint of the effect for improving the tire conductivity, the lower the volume resistivity of the conductive layer, the better; however, from the viewpoint of preventing the phenomenon in which, by blending a large amount of conductive components, the electric resistance is lowered to accelerate an electric chemical reaction at a portion where the tire comes into contact with the rim to cause the rim to become rusty easily, the volume resistivity of the conductive layer is preferably set to $1\times10^3$ $\Omega\cdot cm$ or more, more preferably, to $1\times10^4$ $\Omega\cdot cm$ or more.

Here, when the thickness of the conductive layer is set to 0.2 mm or more, the improving effects for the tire conductivity can be obtained to a desirable degree, and when it is 2.0 mm or less, the rolling resistance of the tire is not lowered so much. The thickness of the conductive layer is preferably set to 0.5 mm or more, more preferably to 0.9 mm or more, and it is preferably set to 1.5 mm or less.

The pneumatic tire of the present invention is applicable as tires for various vehicles, such as passenger cars, trucks, buses and heavy machines. In FIG. 1, a pneumatic tire 1 is provided with a tread section 2, a pair of sidewall sections 3 extending inward in radial directions of the tire from the two ends, and a bead section 4 located at the inner end of each sidewall section 3. Moreover, a carcass 5 is passed over bead sections 4, 4, and a breaker section 6 is placed on the outside of carcass 5 in the radial direction of the tire. Carcass 5 is formed by a carcass ply of one or more sheets on which carcass cords are arranged, and this carcass ply is extended from tread section 2 through sidewall section 3 and turned up from the inside in the tire axis direction outwardly around a bead core 7 of bead section 4 and a bead apex 8 extending from the upper end of bead core 7 toward the side wall, and engaged and stopped by a turnup portion 5a. Breaker section 6 is constituted by plies of two or more sheets on which breaker codes are arranged and superposed with the respective breaker codes being oriented differently so that the respective breaker codes intersect with each other between the plies. In the pneumatic tire of the present invention, a conductive layer 9 having an exposed portion to the tire surface is placed between the carcass ply forming carcass 5 and sidewall rubber forming sidewall section 3.

In the pneumatic tire of the present invention, each sidewall section is preferably formed so that the height H2 from the outside end of each sidewall section to the outside end of the tread section in the tire radial direction is set in a range of 0 to 15% of height H1 from the rim contacting portion to the outer end of the tread section in a tire radial direction in a state where the tire is mounted on a standard rim with a specific inner pressure applied thereto. In other words, in the present invention, in the case when the height from the outside end of each sidewall section to the outside end of the tread section in the tire radial direction is set to 0% or more of the height from the rim contacting portion to the outside end of the tread section in the tire radial direction in a state where the tire is mounted on a standard rim with a specific inner pressure applied thereto, since the tread rubber is allowed to have a sufficient ground contacting face, the durability of the tire is desirably ensured, and in the case when the height is set to 15% or less, since the distortion in the surface of the sidewall is not increased excessively when the tire is rolling; therefore, it becomes possible to prevent cracking in the conductive layer or the rubber cement layer during traveling and consequently to desirably maintain the conductivity.

The above-mentioned conductive layer to be placed in the pneumatic tire of the present invention preferably contains a rubber component and carbon black that is blended to the rubber component in a range from 30 to 100 parts by mass per 100 parts by mass of the rubber component. When 30 parts by mass or more of carbon black per 100 parts by mass of the rubber component is blended, the conductivity of the conductive layer is desirably improved. When the content of carbon black is set to 100 parts by mass or less per 100 parts by mass of the rubber component, the durability is desirably improved. The compounding amount of carbon black per 100 parts by mass of the rubber component is preferably set to 35 parts by mass or more, more preferably to 40 parts by mass or more, and also preferably set to 80 parts by mass or less, more preferably to 70 parts by mass or less.

The nitrogen adsorption specific surface area of carbon black to be blended in the conductive layer is preferably set in a range from 100 $m^2/g$ or more to 1500 $m^2/g$ or less. When the nitrogen adsorption specific surface area is 100 $m^2/g$ or more, the mechanical strength of the conductive layer is desirably improved, and when it is 1500 $m^2/g$ or less, the processability upon manufacturing is desirably maintained. The nitrogen adsorption specific surface area is preferably set to 105 $m^2/g$ or more, and is also preferably set to 1300 $m^2/g$ or less, more preferably to 1000 $m^2/g$ or less.

In addition to carbon black, the conductive layer may contain, for example, silica as a filler, and from the viewpoint of desirable impartment of conductivity, carbon black is preferably allowed to occupy 8 mass % or more, preferably 15 mass % or more, more preferably 100 mass %, of the filler.

In the pneumatic tire of the present invention, silica is preferably allowed to occupy 50% by mass or more of the filler contained in each of a tread rubber, a breaker rubber and a sidewall rubber. When silica occupies 50% by mass or more of the filler, the rolling resistance of the tire is effectively reduced. The rate at which the filler is occupied by silica is preferably set to 70 mass % or more, more preferably, to 90 mass % or more. In the present invention, all the filler may be composed of silica; however, in order to adjust the conductivity and mechanical strength of each of the tread rubber, breaker rubber and sidewall rubber, another filler may be preferably contained in combination.

Silica may be blended in each of the tread rubber, breaker rubber and sidewall rubber, for example, in a range from 5 parts by mass to 100 parts by mass per 100 parts by mass of the rubber component. With respect to the silica, those commonly used for general-use rubbers may be used, and, for example, dry-type white carbon to be used as a reinforcing member, wet-type white carbon and colloidal silica are used. Among these, wet-type white carbon mainly composed of hydrous silicate is preferably used. When the compounding amount of silica is set to 5 parts by mass or more per 100 parts by mass of the rubber component, the wear resistance of the tire is desirably improved, and when it is set to 100 parts by mass or less, it becomes possible to desirably prevent a reduction in the processability and an excessive increase in the costs due to an increase in viscosity of the uncured rubber composition upon manufacturing the tread rubber, breaker rubber and sidewall rubber.

The nitrogen adsorption specific surface area (BET method) of silica to be used as described above is preferably set, for example, in a range from 50 to 300 $m^2/g$, more preferably, from 100 to 200 $m^2/g$. In the case when the nitrogen adsorption specific surface area of silica is set to 50 $m^2/g$ or more, since the reinforcing effect is sufficiently obtained, the wear resistance of the tire is desirably improved. In contrast, in the case when the nitrogen adsorption specific surface area thereof is set to 300 $m^2/g$ or less, the processability upon manufacturing each of the rubbers is desirably improved, and the steering stability of the tire is desirably maintained. Here, the nitrogen adsorption specific surface area can be measured by a BET method in compliance with ASTM D3037-81.

Figure 2:
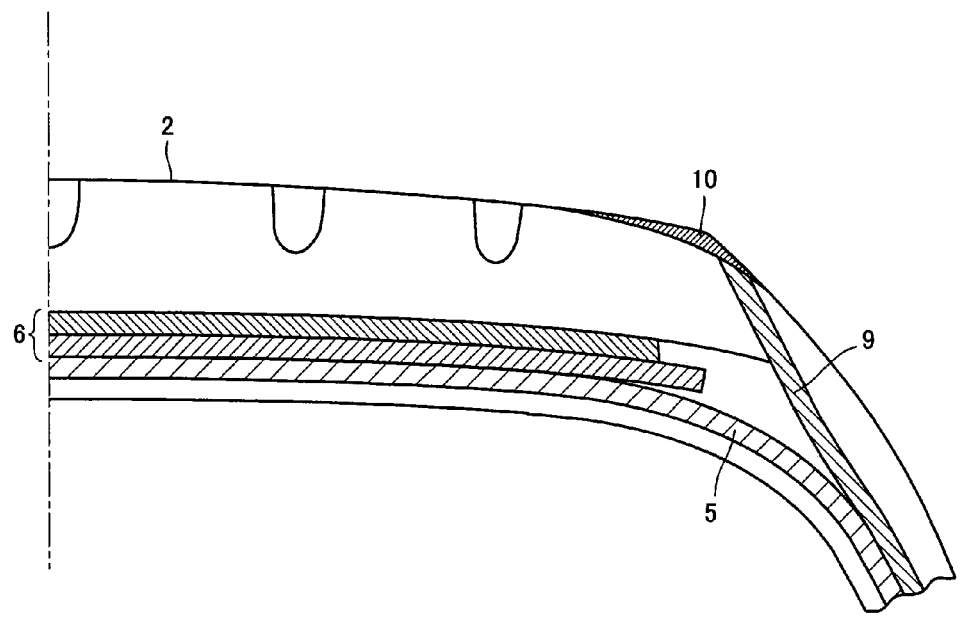
FIG. 2 is a drawing that shows a tread section 2 of a pneumatic tire 1 in accordance with the present invention in an enlarged manner.

In the pneumatic tire of the present invention, as shown in FIG. 2, a rubber cement layer 10 may be formed in an area containing one portion of a section forming the ground contacting face of tread section 2. In a structure shown in FIG. 2, by covering conductive layer 9 with rubber cement layer 10, conductive layer 9 is designed so as not to be exposed to the tire surface. In the pneumatic tire having the structure shown in FIG. 2, since the rubber cement layer having a volume resistivity smaller than the tread rubber is placed in the area containing the ground contacting face of the tire to the road surface so that the conductive layer and the ground contacting face of the tread section are made conductive to each other, static electricity, generated between the road surface and the tire on the ground contacting face of the tread section during traveling, is released to the conductive layer having a high conductivity through the rubber cement layer; therefore, it is possible to prevent a discharging phenomenon caused by the static electricity, and consequently to further improve the safety in use. Moreover, since the rubber cement layer is placed at an area including only one portion of the section forming the ground contacting face, it is possible to prevent the rolling resistance from deteriorating so much.

The rubber cement layer in accordance with the present invention is typically formed through processes in which rubber cement, prepared by mixing a rubber composition in an organic solvent so as to dissolve rubber components in the rubber composition in the organic solvent, is applied to a predetermined portion on the surface of a tire so that the resulting rubber cement is dried and vulcanization-cured. In other words, since the rubber cement layer has been subjected to processes in which after the rubber components have been once dissolved in the organic solvent, the resulting rubber cement layer is dried, the thickness is smaller than that of a layer formed as a rubber sheet. With this arrangement, even when the rubber cement layer is worn upon using the tire during traveling, problems with outside appearance caused by a difference in wearing rates of rubbers in the tread section hardly occur.

It is only necessary for the volume resistivity of the rubber cement layer to be made lower than that of the tread rubber. In this case, the improving effects for the tire conductivity are desirably achieved. From the viewpoint of the improving effects for the tire conductivity, the lower the volume resistivity of the rubber cement layer, the better; however, from the viewpoint of preventing the phenomenon in which, by blending a large amount of conductive components, the electric resistance is lowered to accelerate an electric chemical reaction at a portion where the tire comes into contact with the rim to cause the rim to become easily rusty, the volume resistivity of the cement rubber layer is preferably set to $1 \times 10^3$ Ω·cm or more, more preferably, to $1 \times 10^4$ Ω·cm or more.

Moreover, in the case when the thickness of the rubber cement layer is 0.03 mm or more, even after the rubber cement layer has worn out, the conductivity is desirably ensured properly, and in the case when it is 0.1 mm or less, problems with outside appearance caused by a difference in wearing rates between the rubber cement layer and the tread rubber hardly occur.

The rubber cement layer is preferably composed of a rubber component and rubber containing carbon black blended within a range of 30 to 100 parts by mass per 100 parts by mass of the rubber component. By allowing carbon black to be contained at 30 parts by mass or more per 100 parts by mass of the rubber component, the conductivity and wear resistance of the rubber cement layer are improved, and by setting the content of carbon black to 100 parts by mass or less, the durability is desirably imparted. The content of carbon black is preferably set to 40 parts by mass or more, more preferably, to 50 parts by mass or more, and is also preferably set to 90 parts by mass or less, more preferably, to 80 parts by mass or less.

The nitrogen adsorption specific surface area of carbon black to be blended in the rubber cement layer is preferably set in a range from 100 $m^2/g$ or more to 1500 $m^2/g$ or less. In the case when the nitrogen adsorption specific surface area is set to 100 $m^2/g$ or more, the mechanical strength of the rubber cement layer is desirably improved, and in the case when it is set to 1500 $m^2/g$ or less, the processability upon manufacturing is desirably ensured. The nitrogen adsorption specific surface area is preferably set to 105 $m^2/g$ or more, and is also set to 1300 $m^2/g$ or less, more preferably, to 1000 $m^2/g$ or less.

In addition to carbon black, the rubber cement layer may contain, for example, silica as a filler; however, from the viewpoint of imparting a superior conductive property, only carbon black is particularly preferably contained.

With respect to the organic solvent to be used for forming the rubber cement layer, those solvents that serve as a good solvent for rubber components contained in the rubber composition for the rubber cement layer are preferably used, and examples thereof include: hexane, heptane, petroleum ether, tetrahydrofuran and cyclohexane.

In the pneumatic tire of the present invention, each of the conductive layer and the rubber cement layer, as well as the tread section, the breaker section and the sidewall section, may be composed of a rubber composition in which, for example, the following components are blended. Preferable examples of the rubber components include: natural rubber (NR), epoxydated natural rubber and diene-based synthetic rubbers. Examples of the diene-based synthetic rubbers include: styrene-butadiene rubber (SBR), polybutadiene rubber (BR), polyisoprene rubber (IR), ethylene-propylene-diene rubber (EPDM), chloroprene rubber (CR), acrylonitrile-butadiene rubber (NBR) and butyl rubber (IIR), and the rubber component containing one kind or two kinds or more of these is preferably used. Here, ethylene-propylene-diene rubber (EPDM) refers to a rubber in which a tertiary diene component is contained in ethylene-propylene rubber (EPM). With respect to the tertiary diene component, for example, non-conjugated dienes having carbon atoms of 5 to 20 are listed, and preferable examples include: cyclic dienes, such as 1,4-pentadiene, 1,4-hexadiene, 1,5-hexadiene, 2,5-dimethyl-1,5-hexadiene and 1,4-octadiene, 1,4-cyclohexadiene, cyclooctadiene and dicyclopentadiene; and alkenyl norbornenes, such as 5-ethylidene-2-norbornene, 5-butylidene-2-norbonane, 5-butylidene-2-norbornene, 2-methalyl-5-norbornene and 2-isopropenyl-5-norbornene. In particular, dicyclopentadiene, 5-ethylidene-2-norbornene and the like are preferably used.

With respect to the rubber component used for the conductive layer, diene-based rubbers are preferably used, and among these, natural rubber (NR), styrene-butadiene rubber (SBR), polybutadiene rubber (BR), polyisoprene rubber (IR), epoxydated natural rubber (ENR) and the like are in particular preferably used.

Moreover, with respect to the rubber components used for the rubber cement layer, preferable examples thereof include: natural rubber (NR), styrene-butadiene rubber (SBR), polybutadiene rubber (BR), polyisoprene rubber (IR) and epoxydated natural rubber (ENR).

The following components, which are generally blended in rubber products, may be added to the above-mentioned rubber composition on demand.

In the present invention, when silica is blended in the rubber composition, preferably, a silane-based coupling agent, preferably, sulfur-containing silane coupling agent, is blended in a range from 1% by mass to 20% by mass with respect to the mass of silica. The blending of the silane coupling agent makes it possible to improve the wear resistance and the steering stability of the tire, and in the case of the compounding amount of the silane coupling agent of 1% by mass or more, the improving effects for the wear resistance and steering stability are desirably obtained. Moreover, in the case of the compounding amount of the silane coupling agent of 20% by mass or less, it is possible to reduce the possibility of scorch during the rubber kneading and extruding processes. With respect to the sulfur-containing silane coupling agent, examples thereof include: 3-trimethoxysilylpropyl-N, N-dimethylthiocarbamoyol-tetrasulfide, tnrmethoxysilyl-propyl-mercaptobenzothiazole-tetrasulfide, triethoxysilyl-propyl-methacrylate-monosulfide, dimethoxymethylsilylpropyl-N,N-dimethylthiocarbamoyl-tetrasulfide, bis-[3-(triethoxysilyl)-propyl]tetrasulfide, and 3-marcaptopropyl trimethoxysilane.

With respect to the other silane-based coupling agents, for example, vinyltrichlorosilane, vinyltris(2-methoxyethoxy) silane, γ-glycidoxypropyl trimethoxysilane, γ-methacryloxypropyl trimethoxysilane, γ-(2-aminoethyl)aminopropyl trimethoxysilane, γ-chloropropyltrimethoxy silane and γ-aminopropyl triethoxysilane may be used.

In the present invention, another coupling agent, such as aluminate-based coupling agent and a titan-based coupling agent, may be used alone, or in combination with the silane-based coupling agent, in accordance with the application.

To the rubber composition, other fillers, such as carbon black, clay, alumina, talc, calcium carbonate, magnesium carbonate, aluminum hydroxide, magnesium hydroxide, magnesium oxide and titanium oxide, may be added to be mixed therein, and each of these may be added alone, or two or more kinds of these may be added thereto in combination.

Upon blending carbon black in tread rubber, breaker rubber and sidewall rubber, the carbon black is preferably blended in a range from 10 parts by mass or more to 150 parts by mass or less per 100 parts by mass of the rubber composition. Here, with respect to the characteristics of carbon black, those having the following characteristics are preferably used from the viewpoint of reinforcing effects to the rubber composition: the nitrogen adsorption specific surface area (BET method) is set in a range from 70 to 300 $m^2/g$; the DBP oil absorption is set in a range from 5 to 300 ml/100 g; and the iodine adsorption is set in a range from 146 to 152 mg/g.

In addition to the above-mentioned material, materials such as a vulcanizing agent, a vulcanization accelerator, a softening agent, a plasticizer, an antioxidant, a foaming agent and an anti-scorch agent may be added to the rubber composition.

With respect to the vulcanizing agent, an organic peroxide or a sulfur-based vulcanizing agent may be used. With respect to the organic peroxide, examples thereof include: benzoyl peroxide, dicumyl peroxide, di-t-butyl peroxide, t-butyl-cumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexine-3 or 1,3-bis(t-butylperoxypropyl) benzene, di-t-butylperoxy-diisopropyl benzene, t-butylperoxy benzene, 2,4-dichlorobenzoyl peroxide, 1,1-di-t-butylperoxy-3,3,5-trimethyl siloxane, and n-butyl-4,4-di-t-butylperoxy valerate. Among these, dicumyl peroxide, t-butylperoxy benzene and di-t-butylperoxy-diisopropyl benzene are preferably used. Moreover, with respect to the sulfur-based vulcanizing agent, for example, sulfur and morpholine disulfide may be used. Among these, sulfur is preferably used.

With respect to the vulcanization accelerator, those containing at least one vulcanization accelerator selected from the group consisting of sulfene amide-based, thiazole-based, thiuram-based, thiourea-based, guanidine-based, dithiocarbamic acid-based, aldehyde-amine-based or aldehyde-ammonia-based, imidazoline-based and xantate-based vulcanization accelerators may be used.

With respect to the antioxidant, appropriate materials may be selected from amine-based, phenol-based and imidazole-based compounds, carbamic acid metal salts and waxes, and used.

In the present invention, in order to further improve the kneading processability, a softening agent may be used in combination. With respect to the softening agent, examples thereof include: petroleum-based softening agents, such as process oil, lubricant oil, paraffin, fluidizing paraffin, petroleum asphalt and vaseline; fatty-oil-based softening agents, such as castor oil, linseed oil, rapeseed oil and coconut oil; waxes, such as tall oil, factice, beeswax, carnauba wax and lanoline; and fatty acids, such as linolic acid, palmitic acid, steartic acid and lauric acid.

With respect to the plasticizer, examples thereof include: DMP (dimethyl phthalate), DEP (diethyl phthalate), DBP (dibutyl phthalate), DHP (diheptyl phthalate), DOP (dioctyl phthalate), DINP (diisononyl phthalate), DIDP (diisodecyl phthalate), BBP (butylbenzyl phthalate), DLP (dilauryl phthalate), DCHP (dicyclohexyl phthalate), hydrophthalic anhydride, DOZ (di-2-ethylhexyl azelate), DBS (dibutyl sebacate), DOS (dioctyl sebacate), acetyltriethyl citrate, acetyltributyl citrate, DBM (dibutyl maleate), DOM (2-ethylhexyl maleate) and DBF (dibutyl fumarate).

With respect to the anti-scorching agent used for preventing or delaying scorch, for example, organic acids, such as phthalic anhydride, salicylic acid and benzoic acid, nitroso compounds, such as N-nitrosodiphenyl amine, and N-cyclohexyl thiophthalimide may be used.

EXAMPLES

The following description will discuss the present invention in detail by means of examples; however, the present invention is not intended to be limited by these examples.

<Preparation of Rubber Composition for Conductive Layer>

Compounding components indicated in Table 1 from which sulfur and a vulcanizing agent were excluded were kneaded at 150° C. for 4 minutes by using a tightly-closed type banbury mixer, and to this were added sulfur and the vulcanizing agent and further kneaded at 95° C. for 2 minutes, and the resulting material was subjected to an extrusion process and a calendar process by using conventional methods so that each of rubber compositions A to C for a conductive layer was prepared.

<Preparation of Rubber Composition for Rubber Cement Layer>

Compounding components indicated in Table 2 from which sulfur and a vulcanizing agent were excluded were kneaded at 150° C. for 4 minutes by using a tightly-closed type banbury mixer, and to this were added sulfur and the vulcanizing agent and further kneaded at 95° C. for 2 minutes, and the resulting material was subjected to an extrusion process and a calendar process by using conventional methods so that each of rubber compositions D to F for a rubber cement layer was prepared.

<Preparation of Rubber Composition for Tread Section>

Compounding components indicated in Table 3 from which sulfur and a vulcanizing agent were excluded were kneaded at 140° C. for 4 minutes by using a tightly-closed type banbury mixer, and to this were added sulfur and the vulcanizing agent and further kneaded at 95° C. for 2 minutes, and the resulting material was subjected to an extrusion process and a calendar process by using conventional methods so that a rubber composition G for a tread section was prepared.

<Preparation of Rubber Composition for Sidewall Section>

Compounding components indicated in Table 4 from which sulfur and a vulcanizing agent were excluded were kneaded at 140° C. for 4 minutes by using a tightly-closed type banbury mixer, and to this were added sulfur and the vulcanizing agent and further kneaded at 95° C. for 2 minutes, and the resulting material was subjected to an extrusion process and a calendar process by using conventional methods so that a rubber composition H for a sidewall section was prepared.

<Preparation of Rubber Composition for Breaker Section>

Compounding components indicated in Table 5 from which sulfur and a vulcanizing agent were excluded were kneaded at 140° C. for 4 minutes by using a tightly-closed type banbury mixer, and to this were added sulfur and the vulcanizing agent and further kneaded at 95° C. for 2 minutes, and the resulting material was subjected to an extrusion process and a calendar process by using conventional methods so that a rubber composition I for a breaker section was prepared.

<Measurements on Volume Resistivity of Rubber Composition>

With respect to compositions A to I, each of them was vulcanization-molded at 150° C. for 30 minutes, and the volume resistivity thereof was then measured by JIS K6271. The results are shown in Table 1 to 5.

TABLE 1

| Rubber composition for conductive layer | | Rubber composition A | Rubber composition B | Rubber composition C |
|---|---|---|---|---|
| Compounding rate (parts by mass) | Natural rubber[note 1] | 60 | 60 | 60 |
| | Polybutadiene[note 2] | 40 | 40 | 40 |
| | Carbon black N220[note 3] | 45 | 20 | — |
| | Carbon black N550[note 4] | — | — | 45 |
| | Wax[note 5] | 1 | 1 | 1 |
| | Anti-oxidant[note 6] | 3 | 3 | 3 |
| | Stearic acid[note 7] | 1 | 1 | 1 |
| | Zinc oxide[note 8] | 3 | 3 | 3 |
| | Sulfur[note 9] | 2 | 2 | 2 |
| | Vulcanization accelerator 1[note 10] | 1 | 1 | 1 |
| Volume resistivity ($\Omega \cdot cm$) | | $1.0 \times 10^5$ | $2.0 \times 10^8$ | $1.5 \times 10^9$ |

TABLE 2

| Rubber composition for rubber cement layer | | Rubber composition D | Rubber composition E | Rubber composition F |
|---|---|---|---|---|
| Compounding rate (parts by mass) | Natural rubber[note 1] | 20 | 20 | 20 |
| | Synthetic rubber 1[note 11] | 80 | 80 | 80 |
| | Carbon black N220[note 3] | 50 | 20 | — |
| | Carbon black N330[note 4] | — | — | 50 |
| | Wax[note 5] | 1 | 1 | 1 |
| | Anti-oxidant[note 6] | 3 | 3 | 3 |
| | Stearic acid[note 7] | 1 | 1 | 1 |
| | Zinc oxide[note 8] | 3 | 3 | 3 |
| | Sulfur[note 9] | 2 | 2 | 2 |
| | Vulcanization accelerator 1[note 10] | 1 | 1 | 1 |
| | Hexane | 700 | 700 | 700 |
| Volume resistivity ($\Omega \cdot cm$) | | $0.5 \times 10^5$ | $2.0 \times 10^8$ | $1.0 \times 10^9$ |

TABLE 3

| Rubber composition for tread section | | Rubber composition (G) |
|---|---|---|
| Compounding rate (parts by mass) | Synthetic rubber 2[note 12] | 100 |
| | Silica[note 13] | 50 |
| | Silane coupling agent[note 14] | 5 |
| | Wax[note 5] | 1 |
| | Anti-oxidant[note 6] | 2 |
| | Stearic acid[note 7] | 1 |
| | Zinc oxide[note 8] | 3 |
| | Sulfur[note 9] | 1.5 |
| | Vulcanization accelerator 1[note 10] | 1 |
| | Vulcanization accelerator 2[note 15] | 0.5 |
| Volume resistivity ($\Omega \cdot cm$) | | $1.0 \times 10^{15}$ |

TABLE 4

| Rubber composition for sidewall section | | Rubber composition H |
|---|---|---|
| Compounding rate (parts by mass) | Natural rubber[note 1] | 60 |
| | Polybutadiene[note 2] | 40 |
| | Silica[note 13] | 40 |
| | Silane coupling agent[note 14] | 4.5 |
| | Wax[note 5] | 1 |
| | Anti-oxidant[note 6] | 3 |
| | Stearic acid[note 7] | 1 |
| | Zinc oxide[note 8] | 3 |
| | Sulfur[note 9] | 2 |
| | Vulcanization accelerator 1[note 10] | 1 |
| Volume resistivity ($\Omega \cdot cm$) | | $1.0 \times 10^{15}$ |

TABLE 5

| Rubber composition for breaker section | | Rubber composition I |
|---|---|---|
| Compounding rate (parts by mass) | Natural rubber[note 1] | 100 |
| | Silica[note 13] | 55 |
| | Silane coupling agent[note 14] | 5.5 |
| | Anti-oxidant[note 6] | 2 |
| | Cobalt stearate[note 16] | 2 |
| | Stearic acid[note 7] | 1 |
| | Zinc oxide[note 8] | 10 |
| | Insoluble sulfur[note 17] | 5.5 |
| | Vulcanization accelerator 3[note 18] | 0.9 |
| Volume resistivity (Ω·cm) | | $1.0 \times 10^{15}$ |

[note 1] Trade name "TSR 20" made in Thailand was used as natural rubber.
[note 2] Trade name "BR150B" made by ZEON Corporation was used as polybutadiene.
[note 3] Trade name "Seast 6" (nitrogen adsorption specific surface area: 119 m$^2$/g) made by Tokai Carbon Co., Ltd. was used as Carbon Black N220.
[note 4] Trade name "Seast SO" (nitrogen adsorption specific surface area: 42 m$^2$/g) made by Tokai Carbon Co., Ltd. was used as Carbon Black N550.
[note 5] Trade name "Sunnoc N" made by OUCHI SHINKO CHEMICAL INDUSTRIAL CO., LTD. was used as wax.
[note 6] Trade name "Antigen 6C" made by Sumitomo Chemical Co., Ltd. was used as anti-oxidant.
[note 7] Trade name "Stearic acid Tsubaki(Camellia)" made by NOF CORPORATION was used as stearic acid.
[note 8] Zinc oxide made by Mitsui Mining & Smelting Co., Ltd. was used as zinc oxide.
[note 9] Trade name "Powder Sulfur" made by Karuizawa Seiren was used as sulfur.
[note 10] Trade name "Nockceller-NS-P*" made by OUCHI SHINKO CHEMICAL INDUSTRIAL CO., LTD. was used as vulcanization accelerator 1.
[note 11] Trade name "SBR1500" made by JSR Corporation was used as synthetic rubber 1.
[note 12] Trade name "NS116" made by ZEON Corporation was used as synthetic rubber 2.
[note 13] Trade name "VN3" made by Degusa Japan was used as silica.
[note 14] Trade name "Si69" made by Degusa Japan was used as silane coupling agent.
[note 15] Trade name "Soxinol D" made by Sumitomo Chemical Co., Ltd. was used as vulcanization accelerator 2.
[note 16] Cobalt stearate made by Dainippon Ink & Chemicals, Incorporated was used as cobalt stearate.
[note 17] Trade name "Mu-cron OT20" made by Shikoku Chemicals Co., Ltd. was used as insoluble sulphur.
[note 18] Trade name "Nockceller-DZ-G" made by OUCHI SHINKO CHEMICAL INDUSTRIAL CO., LTD. was used as vulcanization accelerator 3.

Example 1, Comparative Examples 1 to 4

By using the rubber compositions manufactured as described above in combinations shown in Table 6, the tread section, the sidewall section, the breaker section, the rubber cement layer and the conductive layer were formed and vulcanization-molded through conventional methods so that pneumatic tires having a size of 195/65R15 having a structure shown in FIGS. 1 and 2 were manufactured. Here, in the pneumatic tires according to Example 1 and Comparative Examples 1 to 4, each of the sidewall sections was formed so that in FIG. 1, the rate of height H2/height H1×100 (%) was set to 5%.

<Rolling Resistance>

Each of the pneumatic tires prepared in the above manner was mounted on a standard rim with a specified inner pressure of 2.0 MPa applied thereto, and by using a rolling resistance testing machine made by STL Co., Ltd., the rolling resistance was measured at a speed of 80 km/h under a load of 4.7 kN. Based upon a rolling resistance coefficient (RRC) obtained by dividing the measured value of the rolling resistance by the load, the rolling resistance of each of example 1 and comparative examples 1 to 4 was calculated by the following formula, and indicated based upon comparative example 1 given as 100:

(Rolling resistance)=(Rolling resistance coefficient of comparative example 1)/(Rolling resistance coefficient of each of Example 1 and Comparative Examples 1 to 4)×100

The greater the value, the smaller the rolling resistance becomes, making it possible to provide high performances. Table 6 shows the results.

<Tire Conductivity>

Each of the pneumatic tires prepared in the above manner was mounted on a standard rim with a specified inner pressure of 2.0 MPa applied thereto, and with the tread section of the tire being in contact with an iron plate under a load of 4.7 kN, the electrical resistance value between the tire rim section and the iron plate was measured with an applied voltage of 100 V. The results are shown in Table 6.

TABLE 6

| | Example 1 | Comparative Example 1 | Comparative Example 2 | Comparative Example 3 | Comparative Example 4 |
|---|---|---|---|---|---|
| Rubber composition for tread section | G | G | G | G | G |
| Rubber composition for sidewall section | H | H | H | H | H |
| Rubber composition for breaker section | I | I | I | I | I |
| Rubber composition for rubber cement layer | D | E | F | D | D |
| Rubber composition for conductive layer | A | B | C | A | A |
| Height H2/Height H1 × 100 (%) | 5 | 5 | 5 | 5 | 5 |
| Thickness of conductive layer (mm) | 1.0 | 1.0 | 1.0 | 3.0 | 0.1 |
| Thickness of rubber cement layer (mm) | 0.05 | 0.05 | 0.05 | 0.05 | 0.05 |
| Rolling resistance | 100 | 100 | 100 | 97 | 100 |
| Tire conductivity | $6.1 \times E6$ | $>1.0 \times E8$ | $>1.0 \times E8$ | $5.4 \times E6$ | $>1.0 \times E8$ |

As indicated by the results shown in Table 6, in comparative examples 1 and 2 in which the rubber composition having a volume resistivity that is not sufficiently reduced was used as the conductive layer, the improvement in the tire conductivity is not achieved. Moreover, even in the case of the rubber composition having a volume resistivity that is sufficiently reduced, comparative example 3, which has a thick conductive layer of 3.0 mm, fails to exert a sufficient rolling resistance, and comparative example 4, which has a thin conductive layer of 0.1 mm, fails to sufficiently improve the tire conductivity. In contrast, in the case of example 1 in which a conductive layer having a volume resistivity of $1.0 \times 10^5$ Ω·cm is formed with the volume resistivity of each of the tread section, the breaker section and the sidewall section being set to $1.0 \times 10^5$ Ω·cm, both of the rolling resistance and the tire conductivity can be preferably achieved; it is proved that the pneumatic tire of the present invention is superior both in the rolling resistance and the conductivity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pneumatic tire comprising at least: a tread section; a sidewall section; a bead section; and a carcass that reaches said bead section from said tread section through said sidewall section, with a breaker section being placed on the outside of said carcass in a tire radial direction, wherein:

each of tread rubber, breaker rubber, and sidewall rubber that are respectively used to form said tread section, said breaker section, and said sidewall section has a volume resistivity of $1 \times 10^8$ Ω·cm or more, with a single conductive layer having a volume resistivity of smaller than $1 \times 10^8$ Ω·cm and a thickness in a range from 0.2 to 2.0 mm being formed between a carcass ply forming said carcass and said sidewall rubber, said conductive layer (i) extending from a bead section to along an outer edge of the tread section, (ii) being located at the outer edge of the tread section and between the tread section and the sidewall section, and (iii) being formed so as not to be exposed to the surface of said tire, and containing at least a rubber component and carbon black that is blended in a range from 30 to 100 parts by mass per 100 parts by mass of said rubber component;

said carbon black has a nitrogen adsorption specific surface area in a range from 100 m$^2$/g or more to 1500 m$^2$/g or less;

each of said tread rubber, said breaker rubber and said sidewall rubber contains a filler in such a manner that the rate at which silica occupies said filler is set to 50% by mass or more of said filler; and a rubber cement layer is formed to be in contact with said conductive layer at an outer edge of the tread section, and to prevent the conductive layer from being exposed to the ground contacting surface of the tire, which rubber cement layer has a volume resistivity that is lower than that of said tread rubber and that is $1 \times 10^3$ Ω·cm or more, and has a thickness of 0.03 mm or more and 0.1 mm or less, said rubber cement layer being exposed to include a ground contacting surface of the tire and said rubber cement layer being placed at an area including a shoulder portion such that the tread rubber is exposed at the ground contacting surface from the rubber cement layer at the shoulder portion to the equatorial plane of the tire.

2. The pneumatic tire according to claim 1, wherein said sidewall section is formed so that a height from the outside end of said sidewall section to the outside end of said tread section in the tire radial direction is set in a range of 0 to 15% of the height from a rim contacting portion to the outer end of said tread section in a tire radial direction in a state, wherein the tire is mounted on a standard rim with a specified inner pressure applied thereto.

* * * * *